United States Patent Office 3,551,500
Patented Dec. 29, 1970

3,551,500
2-HYDROXY-4-HALO-DIPHENYL SULFONES
Ernst Model and Karl Gätzi, Basel, Switzerland, assignors to Geigy Chemical Corporation, Ardsley, N.Y., a corporation of New York
No Drawing. Filed June 30, 1967, Ser. No. 650,189
Claims priority, application Switzerland, July 5, 1966, 9,759/66
Int. Cl. A01n 9/14; C07c 147/10
U.S. Cl. 260—607                                     8 Claims

ABSTRACT OF THE DISCLOSURE

Antimicrobial diphenylsulphones wherein one benzene ring is substituted in o-position to the —$SO_2$— bridge by hydroxyl and in p-position to the said bridge by halogen of an atomic number of at most 35, both benzene rings being optionally substituted further by halogen or lower alkyl; which novel compounds are especially of antifungal activity e.g. against phytopathogenic fungi, and also of antibacterial activity; compositions containing the new compounds as antimicrobial ingredient, and methods of controlling microbial growth with the aid of the new compounds.

DESCRIPTION OF THE INVENTION

The present invention concerns new diphenyl sulphones having microbial properties, and particularly, microbicidal agents which contain these new diphenyl sulphones as active ingredients, as well as the use of these active ingredients and the agents containing them for the combatting of micro-organisms and for the protection of organic materials from attack by micro-organisms. In addition the invention concerns the material protected from micro-organisms by treatment with the new diphenyl sulphones and processes for the production thereof.

2-hydroxy-diphenyl sulphone and 2-hydroxy-5-chloro-diphenyl sulphone are known at present. Halogenated 4-hydroxy-diphenyl sulphones as active substances in microbicidal agents are disclosed in Belgian Pat. No. 671,-897. As tests showed, their activity is extremely slight against both phytopathogenic fungi as well as against fungi and bacteria which injure and destroy organic materials and objects.

Contrary to these results, halogenated 2-hydroxy-diphenyl sulphones of the general Formula I

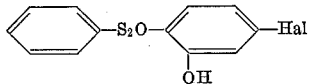

wherein Hal represents a halogen atom up to the atomic number 35, inclusive, and the benzene rings can also be substituted by further halogen up to the atomic number 35 and/or by low alkyl groups have unexpectedly very good microbicidal properties and are valuable for the control of micro-organisms, particularly phytopathogenic fungi.

The new halogenated 2-hydroxy-diphenyl sulphones of general Formula I are active against germs causing powdery mildew disease of the Erysiphacae family, e.g. of the Sphaerotheca and Erysiphe families. Germs causing other types of disease as well as powdery mildew diseases can be combatted by the use of the new diphenyl sulphones. The new active substances protect plants and parts thereof (blossom, seeds, fruit, foliage, stems) from attack by fungi. In addition they serve for the treatment of seeds without affecting germination thereof.

The halogenated 2-hydroxy-diphenyl sulphones of general Formula I of which the benzene ring containing no hydroxyl groups is optionally substituted by additional halogen up to the atomic number 35 inclusive, particularly by chlorine, are of particular importance for combatting the phytopathogenic fungi mentioned above. Examples are: 2-hydroxy-4-chlorodiphenyl sulphone, 2-hydroxy-4,4'-dichlorodiphenyl sulphone, 2 - hydroxy-4,2', 4' - trichlorodiphenylsulphone, 2 - hydroxy-4 - chloro-4' - bromodiphenyl sulphone, 2 - hydroxy-4 - chloro-4'-methyldiphenyl sulphone, 2 ,- hydroxy - 4,4' - dibromodiphenyl sulphone and 2 - hydroxy - 4,3',4' - trichlorodiphenyl sulphone.

The new halogenated 2-hydroxy-diphenyl sulphones of Formula I are obtained by various methods which are known per se. A first type of process consists in diazotising a halogenated 2-amino-diphenyl sulphone of the Formula II

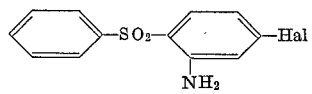

wherein Hal represents a halogen atom of an atomic number of at most 35 and the benzene rings can also be substituted by further halogen up to the atomic number 35 and/or by low alkyl groups, the diazotisation being performed with an agent introducing a nitroso group, in the presence of a strong acid, and boiling down the diazo compound obtained. As agent introducing the nitroso group, particularly nitrosyl sulphuric acid in sulphuric acid is used, also those compounds which yield nitrous acid under the reaction conditions.

Examples of suitable halogen-2-amino-diphenyl sulphones are: 2-amino - 4,4'-dichloro-, 2-amino-4,4' - dibromo-, 2-amino - 4-chloro-4' - bromo-, 2-amino - 4-bromo-4' - chloro-, 2-amino - 4-chloro - 4'-fluoro-, 2-amino - 4,3',4'-tricholor-, 2 - amino - 4,2',4' - trichloro-, 2-amino-4,2',5' - trichloro-, 2-amino - 4-chloro - 4'-methyl- or 2-amino-4,2',4',5'-tetrachloro- diphenyl sulphone.

The halogen-2-amino-diphenyl sulphones usable as starting compounds for this purpose are produced, e.g. by condensing the corresponding 1-nitro-2,5-dihalogenbenzenes with benzene sulphinates or thiophenols or thiophenolates optionally ring-substituted by halogen up to the atomic number 35 and/or by low alkyl groups, while oxidising the sulphide group to the sulphone group and reducing the nitro group to the amino group in the halogen-2-nitro-diphenyl sulphones formed.

The diazotisation of the halogen-2-amino-diphenyl sulphones and boiling of the 2-diazo compounds are performed by known methods.

A second production method consists in that, in a nitro-2-alkoxy-halogen diphenyl sulphone optionally containing further halogen atoms or in an optionally halogenated 2-alkoxy-4-nitrodiphenyl sulphone, the alkoxy group is de-alkylated and the nitro group is reduced to the amino group in any order desired, the latter is diazotised and the diazo group is replaced by halogen or hydrogen, care being taken by choice of starting compounds or performance of the operation that the corresponding 2-hydroxy-diphenyl sulphone contains at least one 4-halogen atom.

The de-alkylation of the alkoxy group as well as the reduction of the nitro group to the amino group, the diazotisation of the latter and the replacement of the diazo group by halogen or hydrogen are also performed by known processes.

A third process consists in the oxidation of corresponding 4-halogen-2-hydroxy-diphenyl sulphides, e.g. with hydrogen peroxide.

Halogen-2-hydroxy-diphenyl sulphones usable according to the invention are obtained by other known processes, (a) by reacting 2-nitro-4-chlorobenzene sulphochloride with optionally halogenated benzene according to Friedel-Crafts, (b) by reacting the sodium salt of optionally halogenated benzene sulphinic acid with 2,5-dihalogen-nitrobenzene. The nitro compounds obtained by these processes are then reduced to the corresponding amines, the amino group is diazotised and boiled down whereby the desired halogen-2-hydroxy-diphenyl sulphones are obtained.

2-hydroxy-4,4',5-trichlorodiphenyl sulphone is also obtained by chlorination of 2-hydroxy - 4,4'-dichloro-diphenyl sulphone.

The following example describes the production of the new halogen - 2-hydroxy-diphenyl sulphones. Where not otherwise stated, parts are given as parts by weight; where not otherwise stated, percentages are percentages by weight; the temperatures are given in degrees centigrade.

EXAMPLE 1

(a) 768 parts of 2,5-dichloronitrobenzene and 578 parts of 4-chlorothiophenol in 400 parts by volume of ethylene glycol are heated to 110° while bubbling through nitrogen and, within 1 hour, 225 parts of potassium hydroxide as 50% aqueous solution are added dropwise. The temperature of the reaction mixture rises to 125–135°, water being distilled off. On completion of the addition, the reaction mixture is heated for 4 hours at 160–165°. The mixture is then added to 3000 parts by volume of hot water to which 120 parts by volume of 30% aqueous sodium hydroxide solution have been added. The 2-nitro-4,4'-dichloro-diphenyl sulphide precipitates. It is filtered off under suction and washed with ethanol. M.P. 151–153°

(b) 1240 parts of a 30% aqueous hydrogen peroxide solution are added, within 2 hours at 100°, to a suspension of 1006 parts of 2-nitro-4,4'-dichlorodiphenyl sulphide in 2000 parts by volume of glacial acetic acid. The reaction mixture is then heated for 4 hours while stirring at 90° and is then cooled to 15°. The 2-nitro-4,4'-dichlorodiphenyl sulphone crystallises out and melts at 128–134°. To reduce the nitro group, 50 parts of 2-nitro-4,4'-dichlorodiphenyl sulphone are hydrogenated within 16 hours with 5 parts of Raney nickel in 150 parts by volume of ethanol under a hydrogen pressure of 2–4 atm. at room temperature. The hydrogen take-up is 98%. The reaction mixture is then brought to the boil, the catalyst is filtered off and two-thirds of the ethanol are distilled off. On cooling, the 2-amino-4,4'-dichlorodiphenyl sulphone crystallises out. M.P. 117–119°.

(c) 453 parts of 2-amino-4,4'-dichlorodiphenyl sulphone are slowly added to the mixture of 1176 parts of a 17% nitrosyl sulphuric acid and 600 parts of sulphuric acid, the addition being made at 20–35°. The reaction mixture is then stirred for 4 hours at room temperature and then, while cooling, 450 parts by volume of water are added. The temperature of the reaction mixture then rises to about 60°. The solution obtained is then put into a previously heated flask in such a way that the temperature of the solution is 130–135° The diazo compound decomposes while nitrogen is developed. On completion of the reaction, the reaction mixture is poured into hot water; the precipitate formed is filtered off and washed with a small amount of water. The filter residue is dissolved with 4500 parts by volume of boiling water and 300 parts by volume of 30% aqueous sodium hydroxide solution and the solution is purified with animal charcoal. 12 parts of sodium hydrogen sulphite are then added to the filtrate which is then added to a solution of 400 parts by volume of concentrated hydrochloric acid in 3000 parts by volume of warm water. The 2-hydroxy-4,4'-dichlorodiphenyl sulphone separates in the form of an ochre yellow precipitate and melts at 125–127°. The yield is 398 parts.

The following 2-hydroxy-diphenyl sulphones are produced in the way described in the above example:

| Compound: | M.P., deg. |
|---|---|
| 2-hydroxy-4-chlorodiphenyl sulphone | 117–118 |
| 2 - hydroxy - 4,3',4' - trichlorodiphenyl sulphone | 134–135 |
| 2-hydroxy - 4,2',4' - trichlorodiphenyl sulphone | 154–156 |
| 2 - hydroxy - 4 - chloro-4'-bromodiphenyl sulphone | 154–156 |
| 2 - hydroxy - 4,4' - dibromodiphenylsulphone | 154–156 |
| 2 - hydroxy - 4 - chloro-4'-methyldiphenyl sulphone | 154–156 |

The fungicidal action of the diphenyl sulphones usable according to the invention is tested on:
(1) *Botrytis cinerea* on beans (*Vicia Faba*)
(2) *Erysiphe cichoracearum* on potted cucumber plants (*Cucumis sativus*)
(3) *Alternaria solani* on tomatoes.

(1) *Botrytis cinerea* on beans (*Vicia faba*)

Petri dishes are lined with moist filter paper and in each dish three freshly cut bean leaves (*Vicia faba*) are placed upper side downward. The leaves are then sprayed with a 0.1% aqueous suspension of active substance. After the spray coating has dried, hte leaves are infested with a fresh suspension of spores of *Botrytis cinerea*. The dishes are covered and left to stand for 1–2 days at room temperature. The test is then evaluated as follows:

0=no growth of fungi
1–9=graduated strength of attack, culminating in
10=total infestation (corresponding to the control plants).

| No. | Compound | Strength of attack |
|---|---|---|
| 1 | 2-hydroxy-4-chlorodiphenyl sulphone | 0 |
| 2 | 2-hydroxy-4,4'-dichlorodiphenyl sulphone | 1 |
| 3 | 2-hydroxy-4,2',4'-trichlorodiphenyl sulphone | 3 |
| 4 | 2-hydroxy-4,3',4'-trichlorodiphenyl sulphone | 2 |

(2) *Erysiphe cichoracearum* on potted cucumber plants (*Cucumis sativus*)

Leaves of potted cucumber plants are sprayed with a 0.1% aqueous suspension of active substance. After the spray coating has dried, the leaves are sprayed with a fresh suspension of spores of *Erysiphe cichoracearum* after which they are put in a moist chamber for 1 day and then placed in a greenhouse. After about 7 days, the test was evaluated as follows:

0=no attack by fungi
1–9=graduated strength of attack culminating in
10=total infestation (corresponding to the control plants).

| No. | Compound | Strength of attack |
|---|---|---|
| 1 | 2-hydroxy-4-chlorodiphenyl sulphone | 5 |
| 2 | 2-hydroxy-4,4'-dichlorodiphenyl sulphone | 3 |
| 3 | 4-hydroxy-2-chlorodiphenyl sulphone * | 10 |
| 4 | 4-hydroxy-2,4'-dichlorodiphenyl sulphone * | 10 |

* The 4-hydroxy-diphenyl sulphones are known from Belgian patent No. 671,897.

(3) *Alternaria solani* on tomatoes

Leaves of 3 to 4 week old tomato plants of the Lukullus variety are sprayed with a 0.1% aqueous suspension of active substance. After the spray coating has dried they are infested with a fresh suspension of spores of *Alternaria solani*. The plants are then kept for 5 to 6 days in a greenhouse at about 20° and 95–100% air humidity. The test is then evaluated as follows:

0=no growth of fungi
1–9=graduated strength of attack culminating in
10=total infestation (corresponding to the control plants).

| No. | Compound | Strength of attack |
|---|---|---|
| 1 | 2-hydroxy-4,3',4'-trichlorodiphenyl sulphone. | 3 |
| 2 | 4-hydroxy-2,2',4'-trichlorodiphenyl sulphone.* | 10 |

* Known from Belgian patent No. 671,897.

The new halogenated 2-hydroxy-diphenyl sulphones of general Formula I possess additional properties which, apart from plant protection, also make them valuable for combatting microorganisms which injure and destroy organic materials and useful objects. These properties also make them valuable for the protection of such materials from attack by micro-organisms. By such micro-organisms are meant fungi and bacteria which attack, in particular, keratin materials, those containing cellulose (wood, fabrics etc. leather), synthetic materials and paints. A good and long lasting protection is given to the materials listed above and objects made therefrom by impregnating them with solutions or dispersions of active substance which have a content of active substance of at least 0.001 g./litre. For this purpose, the active substance can also be used in combination with other substances suitable for protection of material.

The action of bacteria was tested by means of the following bacteriostatic test on the following strains of bacteria: *Staphylococcus aureus* SG 511, *Bacillus pumilus*, *Sarcina ureae*.

As test method, the Agar Incorporation Test according to Leonard and Blackford was used. Nutrient agar plates containing 100, 30, 10 and 3 p.p.m. of active substance (p.p.m. means parts of active substance per $10^6$ parts diluent) are inoculated with the strains mentioned above and incubated 2 × 24 hours at 37°. The marginal concentrations inhibiting the growth of the individual strains are given in the following table.

BACTERIOSTATIC TEST

| Compound | Staph. aureus SG 511 | Bacillus pumilus | Sarcina ureae |
|---|---|---|---|
| 2-hydroxy-4-chloro-2',4'-dichloro-diphenyl sulphone | 30 | 30 | 30 |
| 2-hydroxy-4-chloro-3',4'-dichlorodiphenyl sulphone | 3 | 3 | 3 |
| 2-hydroxy-diphenyl sulphone (J. Chem. Soc. 1938, 899–905) | >300 | >300 | >300 |
| 4-hydroxy-diphenyl sulphone (Belgian Patent No. 671,897) | >300 | >300 | >300 |

The action on fungi was tested on the following strains: *Aspergillus niger*, *Penicillium italicum*, *Fusarium oxysporum*, *Candida albicans*.

As test method, the Agar Incorporation Test according to Leonard and Blackford was used, Nutrient agar plates containing 300, 100, 30 and 10 p.p.m. active substance (p.p.m. means parts of active substance per $10^6$ parts of diluent) are inoculated with solutions of the above strains and incubated 3 × 24 hours at 28°. The marginal concentrations inhibiting the growth of the individual strains are given in the following table.

FUNGISTATIC TEST

| Compound | Aspergillus niger | Penicillium italicum | Fusarium oxysporum | Candida albicans |
|---|---|---|---|---|
| 2-hydroxy-4-chloro-2',4'-dichlorodiphenyl sulphone | 30 | 30 | 30 | 30 |
| 2-hydroxy-4-chloro-3',4'-dichlorodiphenyl sulphone | 30 | 30 | 30 | 30 |
| 2-hydroxy-diphenyl sulphone (J. Chem. Soc. 1938, 899–905) | >300 | >300 | >300 | >300 |
| 4-hydroxy-diphenyl sulphone (Belg. Pat. 671,897) | >300 | >300 | >300 | >300 |

The microbicidal, particularly fungicidal, agents according to the invention are produced by methods known per se by intimately mixing and milling the active substances of general Formula I with suitable carriers, optionally with the addition of dispersing agents or solvents which are inert to the active substances. The active substances can be present in the following forms and used:

Solid forms: dusts, sprinkling agents, granulates such as coated granules, impregnated granules and homogeneous granules;

Water dispersible concentrates of active substances: wettable powders, pastes, emulsions;

Liquid forms: solutions, aerosols.

To produce the solid forms for use (dusts, sprinkling agents, granulates), the active substances are mixed with solid carriers. Examples of carriers are kaolin, talcum, bole, loess, chalk, limestone, ground limestone, ataclay, dolomite, diatomaceous earth, precipitated silicic acid, alkaline earth silicates, sodium and potassium aluminium silicates (feldspar and mica), calcium and magnesium sulphates, magnesium oxide, milled synthetic plastics, fertilisers such as ammonium sulphate, ammonium phosphates, ammonium nitrate, urea, ground vegetable products such as bran, bark dust, sawdust, ground nutshells, cellulose powder, residues of plant extractions, active charcoal, etc. These carriers can be used alone or admixed with each other.

The particle size of the carriers is, for dusts advantageously up to about 100μ, for sprinkling agents from about 75μ to 0.2 mm. and for granulates 0.2 mm. or coarser.

As a general rule, the concentrations of active substances in the solid preparations are from 0.5–80% by weight based on the total weight of the preparation.

To these mixtures can also be added additives which stabilise the active substance and/or non-ionogenic, anionically and cationically active substances which, for example, improve the adhesion of the active substances on plants and parts of plants (glues or adhesives) and/or attain better wettability (wetting agents) and dispersibility (dispersing agents) of the active substances. Examples of adhesives are as follows: olein/chalk mixture, cellulose derivatives (methyl cellulose, carboxymethyl cellulose), hydroxyethyl glycol ethers of mono- and dialkyl phenos having 5–15 ethylene oxide radicals per molecule and 8–9 carbon atoms in the alkyl radical, lignin sulphonic acids, their alkaline and alkaline earth salts, polyethylene glycol ethers (Carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde and also latex products.

The concentrates of active substance which can be dispersed in water, i.e. wettable powders, pastes and emulsion concentrates, are agents which can be diluted with water to any concentration desired. They consist of active substance, carrier, optionally additives which stabilise the active substance, surface active substances and anti-foam agents and, optionally, solvents. The concentration of active substance in these agents is 5–80%.

Wettable powders and pastes are obtained by mixing and milling the active substances with dispersing agents and pulverulent carriers in suitable mixers and milling machines until homogeneity is attained. Carriers are, for example, those mentioned above for solid forms for application. In some cases it is advantageous to use mixtures of different carriers. Condensation products of sulphonated naphthalene and sulphonated naphthalene derivatives with formaldehyde, condensation products of naphthalene or naphthalene sulphonic acids with phenol and formaldehyde as well as alkali, ammonium and alkaline earth salts of lignin sulphonic acid, in addition alkylaryl sulphonates, alkali and alkaline earth salts of dibutyl naphthalene sulphonic acid, fatty alcohol sulphates such as salts of sulphated hexadecanols, heptadecanols, octadecanols, octadecenols, and salts of sulphated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth salts can be used, for example, as dispersing agents.

Examples of anti-foam agents are silicones, "Antifoam A," etc.

The active substances are so mixed, milled, sieved and strained with the additives mentioned above that, in wettable powders, the solid particle size of 20–40µ and, in pastes, of 3µ is not exceeded.

To produce emulsion concentrates and pastes, dispersing agents such as those given in the previous paragraphs, organic solvents and water are used. Examples of solvents are as follows: alcohols, benzene, xylenes, toluene, dimethyl sulphoxide, and mineral oil fractions boiling between 120 and 350°. The solvents must be almost without smell, not phytotoxic, inert to the active substances and not easily inflammable.

In addition, the agents according to the invention can be applied in the form of solutions. For this purpose the active substance or several active substances of general Formula I are dissolved in suitable organic solvents, mixtures of solvents or in water. Aliphatic and aromatic hydrocarbons, chlorinated derivatives thereof, alkyl naphthalenes alone or mixed with each other can be used as organic solvents. The solutions should contain the active substances in a concentration from 1 to 20%.

The agents according to the invention described can be mixed with other biocidally active compounds or agents. Thus the new agents can contain, apart from the compounds mentioned of general Formula I, e.g. insecticides, other fungicides, nematocides, also fertilisers, trace elements, etc. or other known microbicidal active substances, e.g. halogenated salicylic acid alkyl amides and anilides, halogenated diphenyl ureas, halogenated benzoxazoles or benzoxazolones, polychlorohydroxy - diphenylmethanes, halogen-dihydroxy-diphenyl sulphides, halogenated hydroxy-diphenyl ethers, bactericidal 2-imino-imidazolidines or -tetrahydropyrimidines or bactericidal quaternary compounds or certain dithiocarbamic acid derivatives such as tetramethyl thiuram disulphide.

The following forms for application of the agents according to the invention serve to illustrate the useful aspect of the invention; where not otherwise expressly stated, parts and percentages are given by weight.

DUSTS

The following components are used to produce (a) a 10% and (b) a 2% dust:

(a)

10 parts of 2-hydroxy-4,4'-dichlorodiphenyl sulphone,
5 parts of highly dispersed silicic acid and
85 parts of talcum;

(b)

2 parts of 2-hydroxy-4,2',4'-trichlorodiphenyl sulphone,
1 part of highly dispersed silicic acid and
97 parts of talcum.

The active substances mentioned above are intimately mixed and milled with the carriers. The fungicidal dusts so obtained serve for the treatment of earth in seed beds or for dusting plants.

SEED DRESSING

To produce (a) a 10% and (b) a 60% seed dressing, are used:

(a)

10 parts of 2-hydroxy-4,4'-dichlorodiphenyl sulphone,
5 parts of kieselguhr,
1 part of liquid paraffin and
84 parts of talcum;

(b)

60 parts of 2-hydroxy-4,3',4'-trichlorodiphenyl sulphone,
15 parts of kieselguhr,
1 part of liquid paraffin and
24 parts of talcum.

The active substances mentioned are intimately mixed in a mixer with the carriers listed and with the paraffin as distributing agent and then milled. The pulverulent seed dressings obtained serve for the treatment of all types of seeds.

GRANULATES

The following components are used to produce (a) a 2.5% and (b) a 5% granulate:

(a)

2.5 parts of 2-hydroxy-4-chlorodiphenyl sulphone,
2.5 parts of kieselguhr,
5 parts of polyethylene glycol,
89.3 parts of ground limestone (0.4–0.8 mm. diameter) and
0.7 part of silicic acid;

(b)

5 parts of 2-hydroxy-4,2',4'-trichlorodiphenyl sulphone,
1.5 parts of kieselguhr,
0.5 part of cetyl polyglycol ether,
87 parts of ground limestone,
5 parts of polyethylene glycol and
1 part of silicic acid.

The ground limestone is impregnated with the polyethylene glycol or with the cetyl polyglycol ether and then mixed with a mixture consisting of the active substance mentioned, the silicic acid and the kieselguhr. These granulates are particularly suitable for the disinfection of earth in seed beds.

WETTABLE POWDER

The following components are used to produce a 50% wettable powder:

50 parts of 2-hydroxy-4,4'-dichlorodiphenyl sulphone,
5 parts of magnesium carbonate,
5 parts of butyl naphthalene sulphonate (Tinovetin B),
20 parts of calcium silicate,
5 parts of a sulphonated naphthalene/phenol/formaldehyde condensate (Irgatan; registered trademark),
15 parts of Champagne chalk.

The active substance mentioned is mixed with the carriers and distributing agents and finely milled. A wettable powder having excellent wettability and suspendability is obtained. Suspensions of any concentration of active substance desired can be obtained from such wettable powders by diluting with water. These suspensions serve for the treatment of cultivated plants and materials and objects which are subject to attack by fungi and bacteria.

EMULSION CONCENTRATE

The following components are used to produce 25% emulsion concentrate:

25 parts of 4,4'-dichloro-2-hydroxy-diphenyl sulphone,
50 parts of ricinoleic acid,
25 parts of the non-ionogenic and anionogenic mixture of emulsifying agents known under the trade name "Emulsogen E" (produced by Farbwerke Hoescht A. G., Frankfurt and Main).

The active substance is dissolved in ricinoleic acid and the combination of emulsifying agents is then added to this solution. An emulsion concentrate is obtained which can be diluted with water to any concentration desired. Such emulsions are suitable for the treatment of cultivated plants.

We claim:

1. A compound of the formula

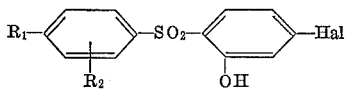

wherein:

Hal represents chlorine or bromine;
$R_1$ represents hydrogen, chlorine, bromine, or methyl; and
$R_2$ represents hydrogen, chlorine, or bromine.

2. A compound as defined in claim 1 wherein Hal and $R_1$ represent chlorine.

3. A compound as defined in claim 1 which is 2-hydroxy-4-chlorodiphenyl sulphone.

4. A comopund as defined in claim 1 which is 2-hydroxy-4,3',4'-trichlorodiphenyl sulphone.

5. A compound as defined in claim 1 which is 2-hydroxy-4,2',4'-trichlorodiphenyl sulphone.

6. A compound as defined in claim 1 which is 2-hydroxy-4-chloro-4'-bromodiphenyl sulphone.

7. A compound as defined in claim 1 which is 2-hydroxy-4,4'-dibromodiphenyl sulphone.

8. A compound as defined in claim 1 which is 2-hydroxy-4-bromo-4'-methyldiphenyl sulphone.

References Cited

UNITED STATES PATENTS

| 2,921,965 | 1/1960 | Dazzi | 260—607 |
| 2,257,969 | 10/1941 | Loane et al. | 250—46 |

FOREIGN PATENTS

| 220,410 | 3/1942 | Switzerland | 260—607 |
| 671,897 | 3/1966 | Belgium | 260—607 |

OTHER REFERENCES

Thoi "Chem. Abstracts," vol. 62 (1965), p. 2730.
Formula Index, cummulative vols. 14–40, p. 592 (third col).

CHARLES B. PARKER, Primary Examiner

D. R. PHILLIPS, Assistant Examiner

U.S. Cl. X.R.

260—141, 578